Jan. 18, 1949.   J. J. BLACK   2,459,765
TRAILER BODY SIDE WALL CONSTRUCTION
Filed April 13, 1944   3 Sheets-Sheet 1
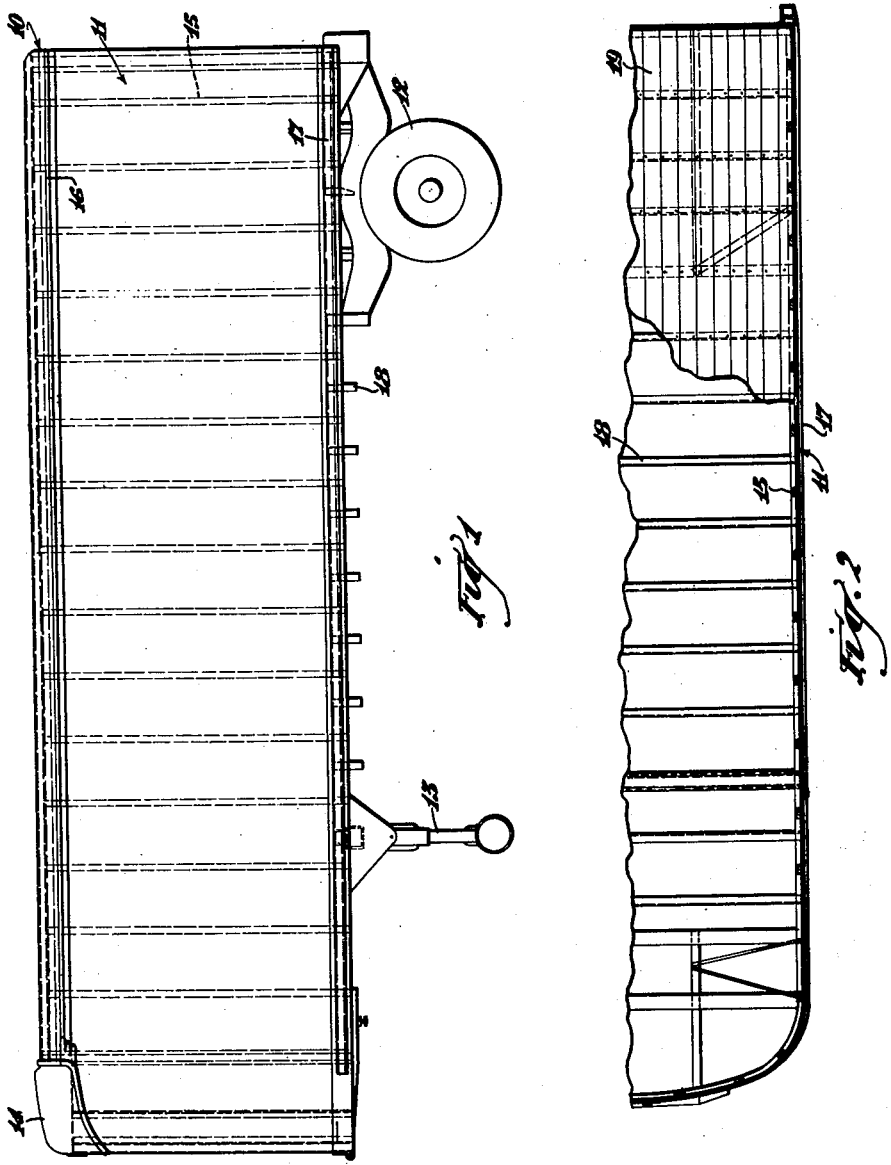
INVENTOR.
BY James J. Black
Wood, Arey, Herron & Evans
Attorneys

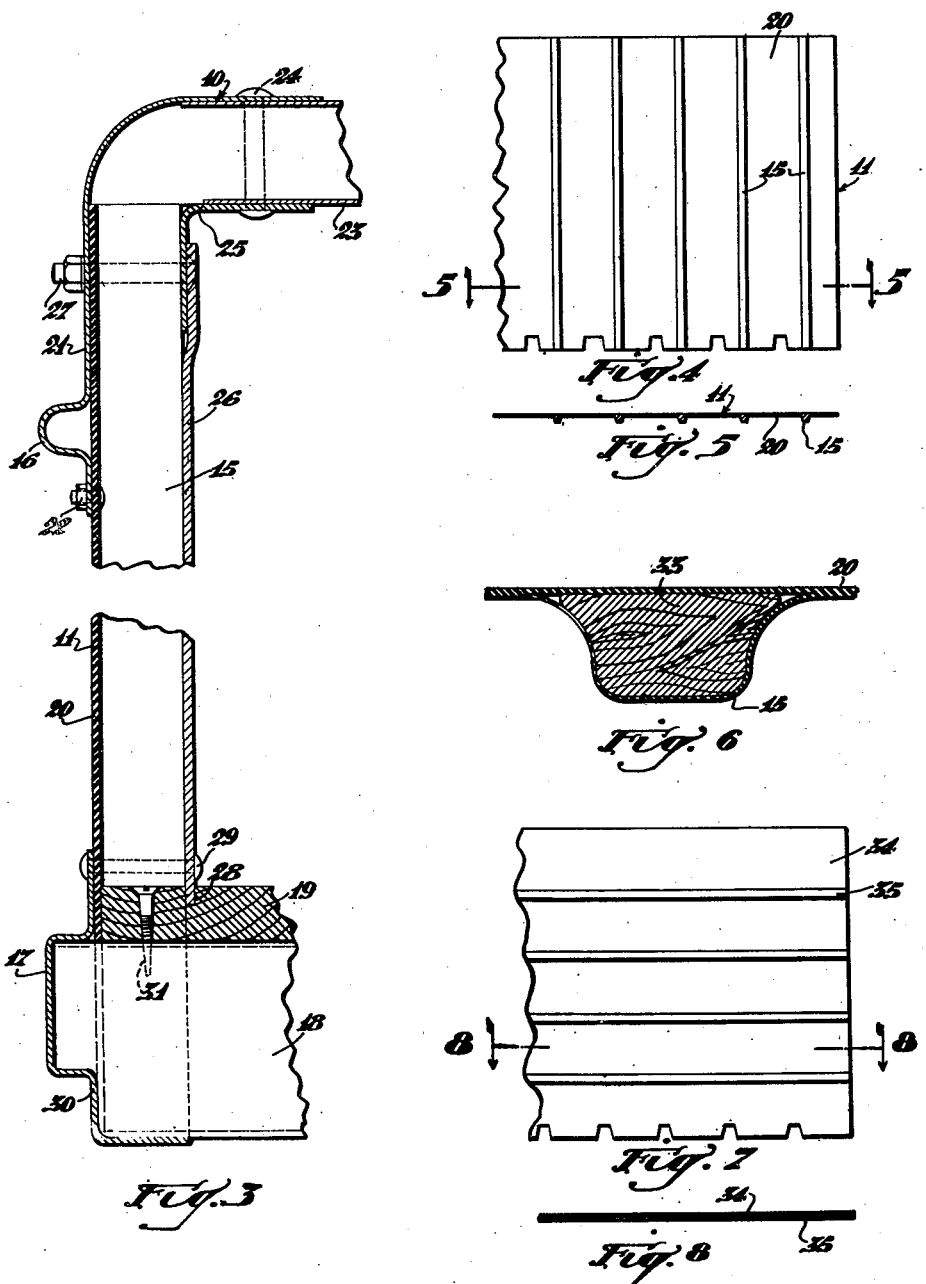

Jan. 18, 1949.  J. J. BLACK  2,459,765
TRAILER BODY SIDE WALL CONSTRUCTION
Filed April 13, 1944  3 Sheets-Sheet 3
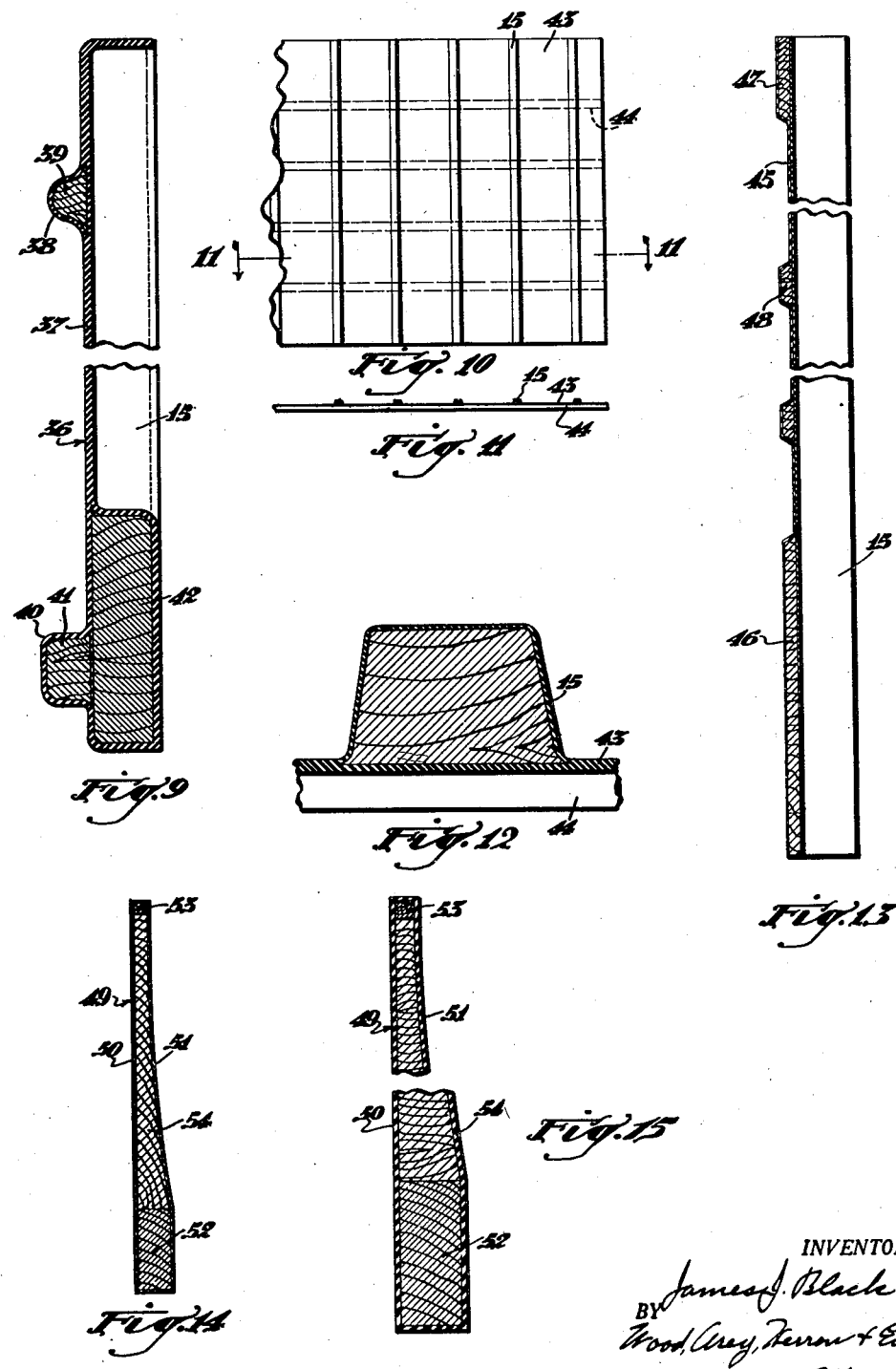
INVENTOR.
James J. Black
BY Wood, Arey, Herron & Evans
Attorneys.

Patented Jan. 18, 1949

2,459,765

UNITED STATES PATENT OFFICE 2,459,765

TRAILER BODY SIDE WALL CONSTRUCTION

James J. Black, Cincinnati, Ohio, assignor to The Trailmobile Company, a corporation of Delaware Application April 13, 1944, Serial No. 530,851

3 Claims. (Cl. 296—28)

This invention relates to body construction for trailers and similar highway vehicles and is particularly concerned with improvements in the wall construction of vehicles of the closed-body type.

For various hauling purposes there has long been a continued demand for trailers, trucks and similar highway vehicles having closed bodies of light and comparatively inexpensive construction. This demand has been answered in the past by various types of wood construction reenforced by bracing, by the use of light gauge steel panels and by corrugated bodies requiring very little additional reenforcing.

One of the objects of the present invention has been to provide an improved type of body construction for highway vehicles employing, in lieu of the wood and light gauge loose steel panels used in the past, continuous unitary sheets of lightweight material plasticized together and molded to the desired contours.

Another object has been the provision of a unitary body for trailers and like highway vehicles in which molded plasticized sheets are employed with various types of reenforcing including particularly vertical or horizontal ribbing or both, the ribbing in some cases including reenforcing and separating rails or posts integrally molded into the plasticized sheets.

Another object has been the provision of wall structures for trailers and the like in which plasticized sheets are combined with reenforcing elements and sections formed from a stronger material such as, for example, sheet steel, to provide a body which combines the various characteristics of strength and low cost of manufacture peculiar to the particular materials.

Another object has been to provide a wall structure for a trailer body in which a substantial degree of rigidity is obtainable through the use of flat plastic sheets only in combination with a filler disposed between the sheets for the entire length of the wall.

Other and further objects and advantages will be apparent from the further and more detailed description of the invention when considered in conjunction with the drawings which illustrate in a representative way various forms of the invention. In these drawings:

Figure 1 is a side elevation of a unitary semi-trailer body constructed in accordance with certain of the concepts of the invention.

Figure 2 is a fragmentary sectional plan view of the floor and lower body portion of the trailer of Figure 1 looking downwardly from an intermediate point.

Figure 3 is an intermediate sectional view of the trailer body illustrated in Figures 1 and 2 and particularly shows the use of plasticized panels in combination with reenforcing and bracing members formed from metal or similar hard material.

Figure 4 is a fragmentary elevation of a plasticized panel of the type utilized in the construction illustrated in Figures 1–3.

Figure 5 is a sectional view along the line 5—5, Figure 4.

Figure 6 is an enlarged detailed view of a single vertical column of the type utilized in the panel shown in Figure 4.

Figure 7 is a fragmentary elevation of a plasticized panel adapted to be used on one side of the wall of the trailer body in certain of the forms of the invention.

Figure 8 is a sectional view along the line 8—8, Figure 7.

Figure 9 is a sectional view similar to Figure 3 illustrating a modified form of construction in which the horizontal reenforcing is obtained entirely through the use of corrugations in the sheets, the walls of the corrugations being separated by rib elements formed from wood or like material.

Figure 10 is an elevational view illustrating the use in combination of the construction illustrated in Figures 4–8, inclusive.

Figure 11 is a sectional view along the line 11—11, Figure 10.

Figure 12 is an enlarged detailed sectional view of a small portion of Figure 11.

Figure 13 is a sectional view similar to Figures 3 and 9 illustrating another modification employing in a somewhat different arrangement certain of the elements illustrated in the other figures.

Figure 14 is an intermediate sectional view of a wall of a different type in which perfectly flat sheets are employed, the reenforcing being obtained through the configuration of the wall and the use of filler elements disposed between inner and outer surfaces of the plasticized sheets.

Figure 15 is a sectional view similar to Figure 14 illustrating a slightly different construction adapted to provide still greater rigidity.

While the invention is very largely concerned with the use of plasticized sheets in the wall construction of trailers and similar vehicles, it is in the configuration of these sheets and their amalgamation into a unitary structure of reenforcing and filler elements that the invention resides rather than in the general concept of using particular materials for this purpose. The sheets may be formed from various of the stronger plastic materials now available on the market or they may be combinations of plastic and wood, plastic and metal, wood and metal, or wood alone. Whichever combination is employed, it is essential to the invention that the sheets be in laminated form and that they be bonded or plasticized together to form a substantially unitary wall structure.

In the trailer body illustrated in Figures 1 and 2 the body has been designated generally as 10 and the side wall as 11. Various conventional elements, such as the undercarriage 12, the prop 13 and the cap 14, are shown in Figure 1. These latter elements form no part of the present invention.

The reenforcing of the body illustrated in Figures 1-6 is obtained from vertical posts 15 disposed on the interior of the side walls and horizontal ribs extending continuously along the side of the body wall on the outside and forming in effect upper and lower rub rails. The upper rub rail has been designated as 16 and the lower rub rail as 17. Horizontal bolsters 18 connect the side walls of the vehicle and may be bowed, as shown, to provide greater strength. A conventional floor 19 may be disposed along the level of the lower rub rail and secured in position in various conventional ways with which the art is entirely familiar.

The details of the construction of the side wall of the body illustrated in Figure 1 are shown in Figures 3-6 inclusive. A continuous laminated sheet 20 having vertical rib elements 15 integrated between the laminations extends continuously from one end of the vehicle to the other. This sheet 20 is disposed between upper and lower rail elements formed from metal or similar rigid material and these elements also extend continuously along the side walls of the vehicle. The upper rail element which is designated as 21 includes a lateral corrugation 16 near the upper edge of the wall which increases the rigidity of the structure and serves as an upper rub rail. The rail 21 which, as shown, has vertical and horizontal portions may have the vertical portions secured directly to the laminated sheet 20 as by bolts 22. The horizontal portion may be secured to the roof 23 by the rivets 24. Inner reenforcing angle pieces 25 are positioned at spaced points along the inner and upper surface of the body and have one arm thereof also secured to the roof 23 by the rivet 24. The vertical arm of the angle pieces may be secured through the inner wall panel member 26 and the post 15 to the outer surface of the rail 21 as by the bolt 27.

The inner wall panel member 26 is secured continuously along the inner side of the walls to the outer panel 20 preferably through the posts 15 as shown. The panel 26 is preferably a smooth, flat sheet providing a finished appearance to the inner surface of the vehicle and may be plywood, Masonite, metal, plastic, or similar materials as desired. At its lower end this inner wall member may be fitted in a slot 28 formed in the floor 19 and may be further secured to the outer wall by the rivets 29 passing through the vertical posts. On the outside of the wall the bolt 29 is inserted through the laminated sheet 20 and the lower rail element 30 which is corrugated to provide the lower rub rail 17. Screws 31 may be inserted from the upper surface of the floor into the bolsters 18. It will be particularly noted in the sectional view shown in Figure 3 that the particular arrangement of sheets and reenforcing members provided effects a strong yet extremely simple construction. Both vertical and horizontal reenforcing are provided and the various materials are each employed to their best advantage. All of the attachment of the various elements is accomplished by bolts, rivets and screws, and welding is completely omitted.

Figures 4, 5 and 6 illustrate the details of construction of the plasticized panel member 20. Vertical posts 33, which may be formed of wood, are inserted between laminations of the sheet material at spaced points and these laminations are then compressed to form the substantially unitary structure illustrated in Figure 6. With the posts on the inner side of the wall a smooth appearing outer surface is provided which is well adapted to decoration for advertising purposes. Aside from their reenforcing properties the posts 33 also provide convenient support for the bolts 27 and rivets 29 which may be inserted through each post or selected ones as desired.

In Figures 7 and 8 there is illustrated a form of longitudinal bracing which can be utilized in the bodies shown in Figures 1, 2 and 3 or in other forms of the invention. In these views a panel sheet 34 has horizontal corrugations 35 formed continuously along its length preferably on the surface of the sheet which is to be disposed toward the outside of the vehicle. Filler rails may be inserted in the corrugations between the laminations of the sheet in the same way as in the case of the vertical posts shown in Figures 4-6.

Figure 9 represents a modified form of the invention in which sheet material and reenforcing rails or posts only are employed. In this form a laminated sheet 36 is molded and configurated to form the unitary outer side wall 37, the upper rub rail 38, and the lower rub rail 40. Longitudinal filling and bracing is accomplished by the rub rails into which the rail members 39 and 41 have been integrated, the construction being similar to that described in connection with Figures 4-8. At the base of the wall a horizontal beam 42 may be completely enclosed by the plasticized sheet for providing greater rigidity to the structure at this point. Vertical corrugations 15 may extend from the top of this beam to the top of the wall and the construction of these will be the same as in the case of the body illustrated in Figures 1-6. This form of the invention particularly emphasizes the possibility of dispensing entirely with metal bracing and attachment means of the conventional type. The wall may be molded as a single unit on a press and may be integrated with the trailer body in any conventional way.

Figures 10-12 illustrate a further modification in which the wall 43 includes both vertical and horizontal corrugations 44, the vertical corrugations being preferably on the inside and the horizontal on the outside. The construction is similar to that previously described. This type of wall may be employed in part in various of the other forms shown, including that illustrated in Figures 1-3 or in Figure 9, or may be used continuously over the entire wall surface. The construction is arrived at by uniting a lamination having vertical corrugations to a lamination having horizontal corrugations, appropriate filler elements being enclosed in the corrugations if desired. The plasticized sheets forming the laminations preferably are flat in their original state, and in order to fabricate them it is necessary to stretch them in one direction only. In this way the expense of drawing a unitary sheet is eliminated.

A further but slight modification is illustrated in Figure 13. The longitudinal bracing in this instance is accomplished by corrugations enclosing filler elements which have a height substantially greater than their thickness and the arrangement is not necessarily symmetrical. The unitary sheet is designated generally as 45, the beam positioned at the base of the wall as 46, the upper beam as 47, and the side rails as 48. In this embodiment it is preferable that the corrugations have a height substantially greater than those in the other forms, such as, for example, the form shown in Figures 10–12, in order to compensate for their lack of thickness.

In the form shown in Figures 14 and 15 a somewhat different type of wall is illustrated. In Figure 14 the wall 49 has an outer panel 50 and an inner panel 51. The two panels are spaced apart a greater distance at the base than at the top. A reenforcing beam 52 is provided at the bottom and a similar beam 53 at the top. These beams may be formed from hard wood such as oak. The interior of the wall may be filled with laminations of some lighter and softer wood 54 or possibly sawdust or other insulating material. The wall is molded as an integral unit and, preferably, the outer sheet may be extended continuously around the base of the beam 52, up the inner side and over the top. Obviously, the greater width and reenforcing provided at the base imparts increased rigidity to the structure.

The form shown in Figure 15 is quite similar except that a still greater degree of reenforcing is accomplished by use of the wider and higher lower beam and the wider spacing between the walls. In both of these forms of the invention it is entirely practical to employ wholly or in part vertical posts and horizontal rails similar to those illustrated in the other forms.

In each of the forms illustrated it will be noted that the invention contemplates the basic combination of plasticized sheets molded to form corrugations and preferably enclosing vertical or horizontal spacing and reenforcing members and with or without additional bracing and reenforcing as the circumstances may require. Utilizing the principles of the invention, a body for a trailer or similar highway vehicle may be constructed which is light in weight, simple and cheap to build, and yet at the same time sufficiently rugged for the major types of uses to which these bodies are put.

Having described my invention, I claim:

1. In a body for trailers or the like, a side wall formed from laminated plasticized sheets, vertical corrugations formed between the laminations on one side of said sheet and horizontal corrugations formed between the laminations on the opposed side, and reenforcing posts and rails disposed in said vertical and horizontal corrugations respectively.

2. In a trailer body, a unitary side wall member formed from sheets of lightweight material plasticized to form a laminated structure, spaced corrugations extending vertically across the sheet and formed in a portion of the laminations on one side of said sheet and similarly spaced corrugations extending horizontally across the sheet and formed in a portion of the laminations on the opposite side thereof.

3. In a body for trailers or the like, a side wall formed from a laminated plastic sheet, said wall having relatively closely spaced inwardly projected corrugations formed therein, reinforcing elements inserted in the corrugations between the laminations of the sheets, a reinforcing panel member secured to the inner faces of the corrugations, and flooring members supported in relation to said side wall, said flooring members notched out so as to fit around the corrugations and said reinforcing panel counter-sunk at its lower end into said flooring.

JAMES J. BLACK.

REFERENCES CITED

The following references are of record in the file of this patent:

UNITED STATES PATENTS

| Number | Name | Date |
| --- | --- | --- |
| Re. 21,850 | Thomson | July 1, 1941 |
| 28,041 | Seely | Apr. 24, 1860 |
| 1,414,419 | Kemp et al. | May 2, 1922 |
| 1,469,220 | Kemp | Oct. 2, 1923 |
| 1,720,790 | Hull | July 16, 1929 |
| 1,814,556 | Jewett, Jr. | July 14, 1931 |
| 1,922,027 | Carter | Aug. 15, 1933 |
| 2,172,571 | Theriault | Sept. 12, 1939 |
| 2,185,961 | Black | Jan. 2, 1940 |

FOREIGN PATENTS

| Number | Country | Date |
| --- | --- | --- |
| 285,743 | Great Britain | Feb. 23, 1928 |
| 306,214 | Great Britain | Feb. 21, 1929 |
| 379,379 | Germany | Aug. 20, 1923 |